United States Patent [19]

Hummel

[11] 4,301,788
[45] Nov. 24, 1981

[54] SOLAR WATER RECLAMATION SYSTEM

[76] Inventor: Steven L. Hummel, 2403 N. Corona, Colorado Springs, Colo. 80907

[21] Appl. No.: 51,832

[22] Filed: Jun. 25, 1979

Related U.S. Application Data

[63] Continuation-in-part of Ser. No. 967,417, Dec. 7, 1978.

[51] Int. Cl.³ .............................................. F24J 3/02
[52] U.S. Cl. ..................................... 126/435; 126/417; 126/437; 126/344; 126/452; 62/235; 237/81; 37/13
[58] Field of Search ............... 126/417, 416, 432, 437, 126/452, 400, 344, 367; 62/235; 237/28, 34, 81; 37/12, 13

[56] References Cited

U.S. PATENT DOCUMENTS

| | | | |
|---|---|---|---|
| 2,763,939 | 9/1956 | Zamboni | 62/235 X |
| 2,795,870 | 6/1957 | Leduc | 37/13 |
| 3,390,672 | 7/1968 | Snelling | 126/433 |
| 4,052,000 | 10/1977 | Hon-Kman | 126/437 |
| 4,071,966 | 2/1978 | Cohen | 37/12 |
| 4,100,756 | 7/1978 | Albertson | 126/435 X |
| 4,119,086 | 10/1978 | Brussels | 126/437 X |
| 4,124,020 | 11/1978 | Noble | 126/435 |

*Primary Examiner*—Larry Jones
*Attorney, Agent, or Firm*—Watson, Cole, Grindle & Watson

[57] ABSTRACT

An energy-saving system for reclaiming the waste water contained in the ice shavings obtained from resurface ice at an ice skating rink, the system including a first tank for holding the ice shavings, a second tank for storing the waste water from the melted ice shavings, a first conduit system for conveying waste water from the melted shavings in the first tank to the second tank, a second conduit system for conveying waste water from the second tank to be sprayed on the shavings in the first tank, and a solar heating system for supplying heated waste water to the second tank.

10 Claims, 2 Drawing Figures

SOLAR WATER RECLAMATION SYSTEM

This application is a continuation-in-part of U.S. patent application Ser. No. 967,417, filed Dec. 7, 1978.

BACKGROUND OF THE INVENTION

In the normal operation of an ice skating rink, it is necessary to periodically smooth the surface of the ice. This is accomplished by use of a mobile unit which passes over the surface of the ice and shaves away a relatively thin layer of the ice. The ice shavings produced by this process are conveyed to a collection tank within the ice shaving apparatus itself and are stored there until the shaving process is completed. The ice shavings stored in the apparatus are then hauled to a dumping site.

After the surface of the ice has been shaved, a thin layer of melted water is flushed over the surface of the ice. This layer of water freezes, providing a new surface for skating.

There are two common methods of disposing of the generated ice shavings. In the first method the shavings are accumulated in the outside environment until ambient conditions cause them to melt and the water runs off. In the second method the ice is artificially heated to a point just above its melting point and discharged to run off into an existing sewer system.

The current expense of natural gas, fuel oil and/or electricity prohibit the reclamation of this water by heating it to a point where it can be used in the ice resurfacing process, which must be heated to approximately eighty degrees Fahrenheit (80° F.) to achieve a proper application.

Typically for a standard ice skating rink, the ice shaving process removes approximately 165 gallons of water per shaving operation. The removed ice is disposed of and wasted. This means a monthly water loss of approximately 50,000 gallons. In winter operation, this ice is often hauled away to a location remote from the skating rink, adding additional costs for trucks, lifts, fuel and labor. In other operations the ice is placed in a tank and heated by a heating system employing conventional fuels or electricity. This procedure adds considerable cost to the disposal of the waste-water. In addition, most locations in the United States and elsewhere charge a fee to the ice skating rink for the water employed in its operations. The loss of the water through disposal of the shaved ice, therefore adds considerable costs to the operation of an ice skating rink.

The object of the present invention is to provide a system wherein the water produced from ice shavings at an ice rink can be cheaply and efficiently reclaimed.

SUMMARY OF THE INVENTION

According to the present invention, the waste water contained in ice shavings from an ice skating rink is reclaimed by employing a solar heating system of the type disclosed in my copending U.S. patent application Ser. No. 967,417. Thus, the waste water can be recovered using solar radiation and heat from other sources, such as heat radiated from the earth and from plants and animals.

DESCRIPTION OF THE INVENTION

Figure 1:
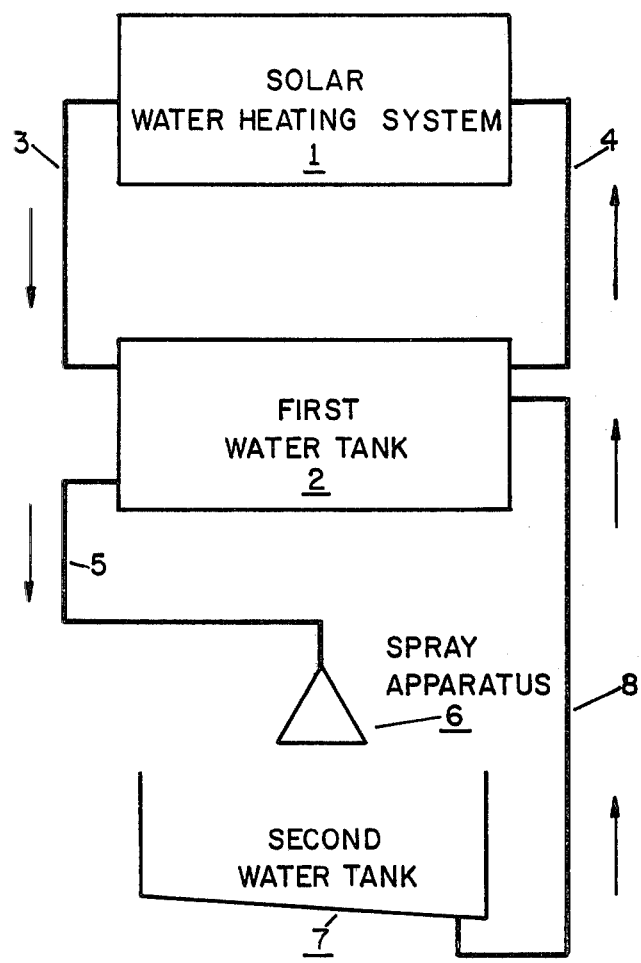
FIG. 1 of the drawings schematically illustrates the basic components of the inventive system and FIG. 2 shows the elements of an embodiment of the inventive system in detail.

Referring to FIG. 1, a solar water heating system 1 is used to heat water which is then stored in the water tank 2 where it is maintained at the desired temperature. A piping system 3 and 4 for circulation of the water to and from the solar water heating system 1 is provided.

The heated water in the water tank 2 is directed through conduit 5 to spray head 6 and allowed to flow over the ice shavings contained in a water tank 7. The water from the water tank 2 and from the melted ice shavings may be allowed to accumulate in the water tank 7 or be diverted back through conduit 8 to the water tank 2 for storage and additional heating.

Figure 2:
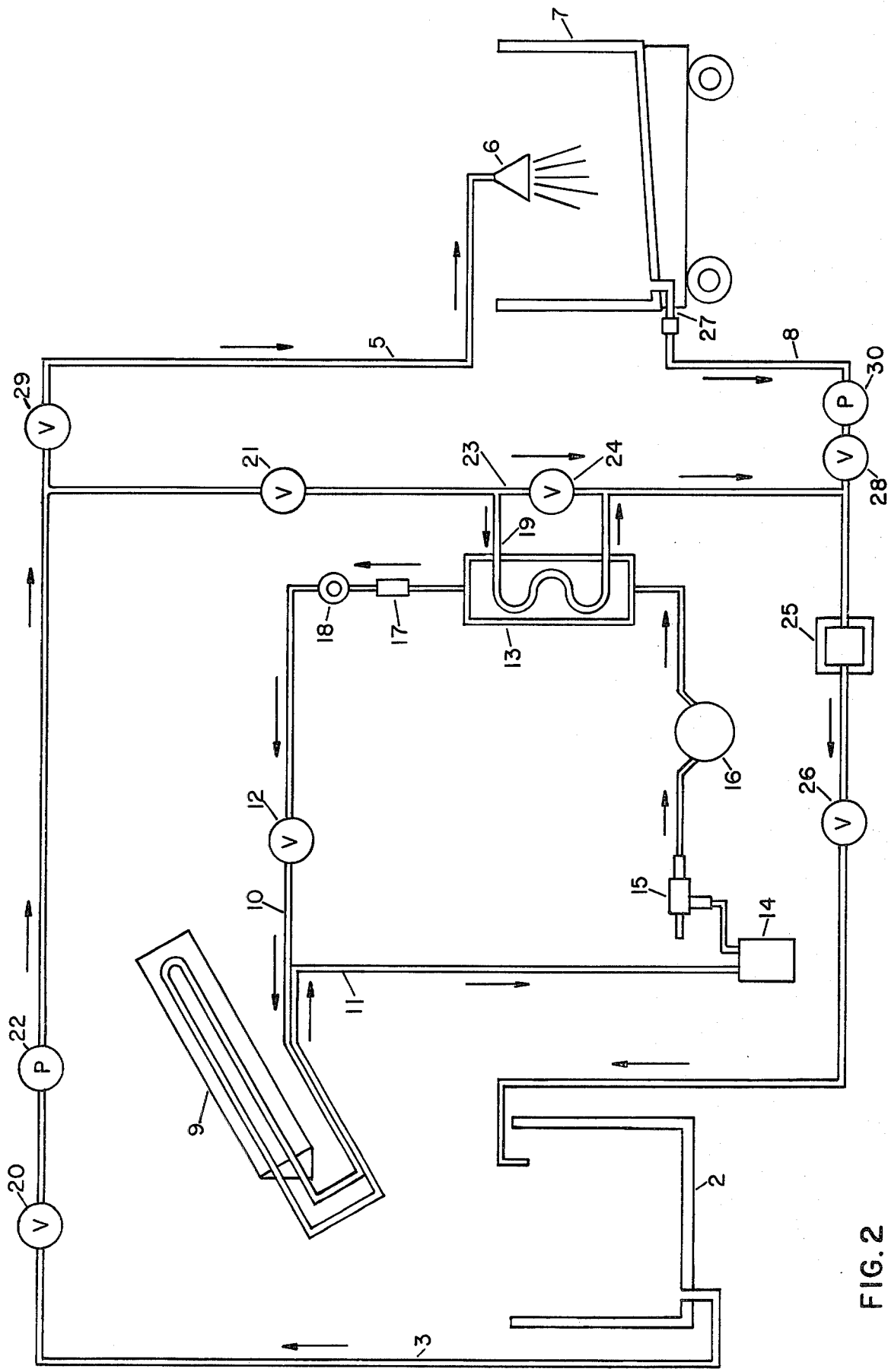

Referring now to FIG. 2, the preferred system includes an external heat exchanger or solar panel collector plate 9, an input conduit 10, a return conduit 11, a thermal expansion valve 12 and an internal heat exchanger 13. The system is closed and connected by conduit from one component to another with a volatile fluid refrigerant confined therein. The volatile fluid passes into the external heat exchanger or solar panel 9 through conduit 10, where it undergoes a phase change to a vapor. When this occurs, energy is extracted from the environment surrounding the external heat exchanger or solar panel 9. Volatile fluid enters conduit 10 through the thermal expansion valve 12 as a liquid-vapor mixture. Volatile fluid passes through the conduit 11 as a vapor. Conduit 10 is in contact or other heat exchange configuration with conduit 11. Heat exchange occurs between conduits 10 and 11 and therefore between the volatile fluids contained therein. As this occurs, the volatile fluid in conduit 10 undergoes varying degrees of phase change prior to reaching the external heat exchanger or solar panel 9. At the same time, the volatile fluid passing through conduit 11 is cooled by the heat loss to conduit 10. The effect of this heat exchange between conduits 10 and 11 is greatest when large amounts of energy are available on the external heat exchanger or solar panel 9. The volatile fluid in gaseous form in conduit 11 passes to an accumulation chamber 14, and from there passes on to a pressure regulator 15 located ahead of a compressor 16. This regulator acts to prevent damage to the compressor 16 should the pressure of the returning volatile fluid be too high. The regulated volatile fluid is then compressed to a high pressure in compressor 16. This compression adds additional heat to the volatile fluid.

The volatile fluid leaves the compressor 16 in a vapor state and passes through heat exchanger 13 where it gives up heat energy. From this point it completes its path through the circuit by passing through a dryer 17, a sight glass 18 and a thermal expansion valve 12. The dryer 17 serves the function of removing any foreign materials from the system, including any moisture. The sight glass 18 makes it possible to check the charge of the system for level and for the presence of any air bubbles. The heat from the internal heat exchanger 13 is picked up by water circulating through the internal heat exchanger 13 in conduit 19. This water comes from the water tank 2, through conduit 3. Valves 20 and 21 and pump 22 are provided in conduit 3 to regulate the flow of water as required. A by-pass conduit 23 and valve 24 are provided to further regulate the flow of water. A filter 25 may be provided to trap any foreign material entering the system. The water then passes back to water tank 2 by passing through conduit 4. Again, a valve 26 is provided to regulate this flow.

When the mobile ice shaver vehicle which includes a water tank 7, has returned from the ice skating rink with a load of ice shavings, it is attached at its drain 27 to conduit 8. Valves 28 and 29 are positioned to allow the circulation of water by the operation of pumps 22 and 30. The water is circulated from the water tank 7 of the mobile ice shaver vehicle through conduit 5 to a spray device 6 positioned over the ice in the water tank 7, whereupon the heated water contained in the water tank 2 is sprayed onto the surface of the ice shavings. Spraying this heated water onto the ice shavings causes them to melt. The water, including the melted ice contained in the mobile ice shaving vehicle, may be stored there for the next resurfacing operation or it may be returned to the water storage tank 2 to be heated by circulating through the internal heat exchanger 13 of the solar water heating system.

I claim:

1. A system for reclaiming the waste water contained in ice shavings, said system including
    a first storage means in which ice shavings can be deposited,
    a second storage means in which waste water can be stored,
    a first conduit means for passing the waste water from the melted ice shavings in said first storage means to said second storage means,
    a spraying means positioned adjacent the ice shavings in said first storage means,
    a second conduit means for conveying waste water from said second storage means to said spraying means to be discharged into contact with the ice shavings,
    a closed heating system which includes an external solar heat exchanger and an internal heat exchanger, and
    a third conduit means connected between said second conduit means and said first conduit means, said third conduit means including a portion which passes through said internal heat exchanger to thereby heat the waste water passing through said third conduit means and thus heat the waste water passing to said second storage means.

2. A system as defined in claim 1, wherein said first storage means comprises an open tank in a movable ice resurfacing vehicle.

3. A system as defined in claim 1, wherein said closed heating system also includes
    a compressor,
    a first pipe means connecting said external solar heat exchanger to said compressor,
    a second pipe means connecting said compressor to said internal heat exchanger,
    an expansion valve,
    a third pipe means connecting said internal heat exchanger to said expansion valve,
    a fourth pipe means connecting said expansion valve to said external solar heat exchanger, and
    wherein a volatile fluid passes through said closed heating system.

4. A system as defined in claim 3, wherein said first and fourth pipe means have portions which are positioned in heat transfer relationship to one another.

5. A system as defined in claim 4, wherein said portions of said first and fourth pipe means are in contact with one another.

6. A system as defined in claim 1, wherein said first conduit means includes a water pump.

7. A system as defined in claim 1, wherein said second conduit means includes a water pump.

8. A system as defined in claim 1, wherein said spraying means is positioned over the ice shavings in said first storage means such that the waste water discharged therefrom will be discharged onto the upper surface of said ice shavings.

9. A method for reclaiming the waste water contained in ice shavings, said method comprising
    depositing ice shavings in a first storage means,
    circulating the waste water via a first conduit means from the melted ice shavings in said first storage means to a second storage means,
    circulating the waste water via a second conduit means from said second storage means to a spraying means located adjacent the ice shavings in said first storage means so as to be discharged into contact with said ice shavings and to help melt the same,
    circulating waste water via a third conduit means from said second conduit means to said first conduit means, and
    heating the waste water passing through said third conduit means via a solar heating means.

10. A method as defined in claim 9, wherein the waste water circulated to said spraying means is discharged therefrom so as to contact the upper surface of the ice shavings in the first storage means.

* * * * *